Patented Sept. 22, 1942

2,296,584

UNITED STATES PATENT OFFICE 2,296,584

GROWTH PROMOTING MEDIA

Herbert Stummeyer, Mannheim, Germany, assignor to Winthrop Chemical Company, Inc., New York, N. Y., a corporation of New York No Drawing. Application November 21, 1939, Serial No. 305,461. In Germany October 30, 1937

4 Claims. (Cl. 71—2)

The present invention relates to new growth promoting media.

It is known that the growth of cuttings may be favored by treating their cut surfaces with growth promoting substances. Thus, growth promoting substances have already been incorporated for instance in water-containing woolfat and the paste so obtained has been applied to the cutting. As the pastes are impermeable to water the cuts have to be free from paste to enable the cutting to absorb water. The matter of applying the growth promoting substances is, therefore, somewhat troublesome.

It has now been found that particularly efficacious and more easily applicable growth promoting media are those containing the growth promoting substance, i. e. any substance which promotes the formation and/or the growth of roots, in admixture with one or several water miscible (i. e. water soluble or dispersable) high molecular organic compounds which bear several hydroxyl- and/or ether groups as solubilizing groups and which are resistant to putrefaction in the ground.

Such water soluble or dispersable high molecular compounds are by way of example cellulose ethers, polymerization products of oxygen containing vinyl compounds or of ethylene oxide, or polyglycol ethers or organic compounds which contain one or more hydroxy-, mercapto-, carboxylic acid- or amino groups. Suitable substances for the manufacture of the preparations according to the invention are above all cellulose ethers, for instance cellulose methyl ether or cellulose hydroxylalkyl or alkoxylalkyl ethers as well as polyvinyl alcohol and the like. Further polyglycolethers may be employed which are obtainable by causing to react either ethylene oxide or polyglycolethers or compounds yielding those ethers upon organic compounds containing in the molecule hydroxy-, mercapto-, carboxylic acid or amino groups whereby the quantities of the ethylene oxide or the polyglycolethers are so chosen that at least 1 polyglycolether radical with 4 or more —$C_2H_4$-groups may enter the molecule of the said organic starting substance.

The aforementioned substances do not putrefy in the ground nor cause putrefaction of the plants. They do not impair the action of the growth promoting substances and are easily miscible with them; the mixtures thus obtained are furthermore easily dosable.

As growth promoting ingredients there come for instance into consideration β-indolyl acetic acid, β-indolyl propionic acid, β-indolyl butyric acid, α-naphthalene acetic acid, α-naphthalene butyric acid, their salts or esters, N-pyrimidyl-5'-alkyl-thiazolium salts particularly aneurine and its homologue biotin and active compounds derived therefrom as well as isoalloxazines, particularly lactoflavine.

Also other substances important for the nutrition of the plant or stimulating agents may be present in our preparation.

The described preparations are preferably diluted with water whereby advantageously such a quantity of water is employed that liquid solutions capable of forming drops when flowing out are obtained. Into these solutions the plants are immersed with their cut surface whereby a strongly adhering coating is formed which contains a sufficient quantity of the substance stimulating the root formation. On the one hand the growth promoting substance diffuses into the plant itself and on the other hand into the surrounding ground. Thus the conditions for promoting the growth of roots are very favorable. When using the described solutions the root formation of cuttings taken of the most varied kinds of plants is much increased.

The new preparations share with the hitherto known growth promoting substances the advantage that a dosed quantity of the growth promoting substance can be applied to the cutting. They are, however, distinguished from such pastes by their simple manner of application (immersing of the cut surface into the preparation according to the invention, advantageously after dilution with water).

It is to be noted that not only liquid preparations may be used, but also solid mixtures comprising for instance a solid growth promoting substance together with one or several of the said water miscible high molecular organic compounds eventually in admixture with a solid carrier such as talc, chalk or silica. It is also possible to adsorb liquid preparations to a usual absorbent. Such solid preparations may be applied as such to the cutting which is then put into the soil.

The following examples illustrate the invention without, however, restricting it thereto, the parts being by weight:

Example 1

100 parts of an easily water soluble cellulose ether in powder form is mixed with 0.001 part of the sodium salt of α-naphthalene acetic acid. The preparation thus obtained is easily soluble in water and can preferably be used for treating cuttings.

Example 2

200 parts of boiling water are poured over 10 parts of a mixture of cellulose hydroxyethylether and cellulose methylether. The mixture is then divided into 6 portions of about 30 parts each. One of those 6 portions is mixed with 35 parts of water, the other with 35 parts of water and an aqueous solution of α-naphthalene acetic acid. The mixtures had the following concentrations with regard to the growth promoting substances:

|  | Per cent |
|---|---|
| Preparation 1 | 0 |
| Preparation 2 | 0.002 |
| Preparation 3 | 0.004 |
| Preparation 4 | 0.006 |
| Preparation 5 | 0.008 |
| Preparation 6 | 0.01 |

Into these preparations each 30 willow cuttings are immersed with their cut surface whereby the preparation covers the cuts with a well adhering coating. The cuttings are then immediately put into the soil. After 9 days they are unpotted; thereby it could be observed that the cuttings treated with the preparation containing no growth promoting substance showed only a weak root formation. The cuttings which had been treated with the preparation 2 to 6 containing the growth promoting substances showed more and much stronger roots. The strength of the roots corresponds to the amount of the growth promoting substance contained in the preparation.

Example 3

According to the directions given in Example 2 preparations containing cellulosemethyl-hydroxyethylether and β-indolyl acetic acid are prepared. These preparations contain the active growth promoting agent in the following concentrations:

|  | Per cent |
|---|---|
| Preparation 1 | 0 |
| Preparation 2 | 0.001 |
| Preparation 3 | 0.01 |
| Preparation 4 | 0.03 |
| Preparation 5 | 0.05 |
| Preparation 6 | 0.075 |
| Preparation 7 | 0.1 |

These preparations are tested on willow cuttings as regards their capacity of causing root formation as described in Example 2. It is to be observed that the cuttings which were treated with preparation 1 which contains no growth promoting substance show after 9 days only a slight formation of roots whereas the preparation 2 to 7 causes the cuttings to take numerous and strong roots.

Example 4

20 parts of an aqueous 50 per cent solution of polyvinylmethylether are triturated to a homogeneous mass together with 10 parts of wool-fat and then diluted with 5 parts of water. 20 parts of this viscous mass are mixed with 5 parts of a 0.125 per cent solution of the potassium salt of β-indolyl acetic acid (growth promoting substance). Into this mass cuttings of ageratum are immersed with their cut surfaces to a depth of 1 to 1.5 cms. and put into the soil.

It is to be observed that the cuttings show already after 10 days a very good root formation.

Example 5

15 parts of a polymerized ethylene oxide (melting point 60°) are triturated to a homogeneous mass with 12.3 parts of water and mixed with 0.7 part of a 0.1 per cent aqueous solution of the potassium salt of β-indolyl acetic acid (growth promoting substance). The mass contains about 0.025 per cent of the growth promoting substance. Into this mass cuttings of ageratum are immersed with their cut surfaces up to a depth of 1 to 1.5 cms. and put into the soil.

After 10 days the cuttings thus treated show a very good root formation.

This application is a continuation in part of application Serial No. 237,301, filed October 27, 1938.

I claim:

1. Growth promoting media comprising a growth promoting substance selected from the group consisting of the β-indoyl and α-naphthalene carboxylic acids in admixture with methyl cellulose and which are resistant to putrefaction in the ground.

2. Growth-promoting media comprising a growth-promoting substance selected from the group consisting of the β-indolyl and α-naphthalene carboxylic acids in admixture with a high molecular organic compound selected from the group consisting of water-miscible cellulose ethers, polyvinyl ethers and polyglycol ethers, said ethers being resistant to putrefaction in the ground.

3. Growth-promoting media comprising a growth-promoting substance selected from the group consisting of the β-indolyl and α-naphthalene carboxylic acids in admixture with polyvinyl methylether and which are resistant to putrefaction in the ground.

4. Growth-promoting media comprising a growth promoting substance selected from the group consisting of the β-indolyl and α-naphthalene carboxylic acids in admixture with polymerized ethylene oxide having a melting point of 60° C. and which are resistant to putrefaction in the ground.

HERBERT STUMMEYER.